United States Patent [19]

Bergez et al.

[11] Patent Number: 4,545,964

[45] Date of Patent: Oct. 8, 1985

[54] PROCESS FOR THE PREPARATION OF POROUS PRODUCTS BASED ON COBALT FLUORIDE OR LEAD FLUORIDE

[75] Inventors: Pierre Bergez, Paris; Alain Deguelte, Les Lilas; Laurent Seigneurin, Salindres, all of France

[73] Assignee: Commissariat a l'Energie Atomique, Paris, France

[21] Appl. No.: 466,943

[22] Filed: Feb. 16, 1983

[30] Foreign Application Priority Data

Feb. 24, 1982 [FR] France .............................. 82 03020

[51] Int. Cl.$^4$ ............................................. C01G 51/08
[52] U.S. Cl. .................................... 423/138; 423/464;
423/489; 423/493; 75/0.5 A; 75/0.5 B;
502/229; 427/372.2; 427/226
[58] Field of Search ................. 423/464, 489, 493, 38,
423/2, 258, 138; 75/0.5 B, 0.5 AA, 0.5 BA, 0.5
A, 119; 502/229; 427/372.2, 226

[56] References Cited

U.S. PATENT DOCUMENTS

| 2,959,557 | 11/1960 | Hansford | 423/489 |
| 3,121,696 | 2/1964 | Hoekstra | 502/229 |
| 3,383,431 | 5/1968 | Fishel | 502/229 |
| 3,956,147 | 5/1976 | Becker et al. | 423/489 |

FOREIGN PATENT DOCUMENTS

| 263780 | 12/1926 | United Kingdom | 423/489 |
| 303760 | 7/1927 | United Kingdom | 423/489 |

OTHER PUBLICATIONS

Gmelins Handbuch Der Anorganischen Chemi, Blei, Teil C. Lieferung 1, No. 47, 1969—Verlag Chemi GmbH, Weinhein (DE) pp. 273-278.

Primary Examiner—John Doll
Assistant Examiner—Robert L. Stoll
Attorney, Agent, or Firm—Pearne, Gordon, Sessions, McCoy, Granger & Tilbery

[57] ABSTRACT

A process for the preparation of porous products containing cobalt fluoride $CoF_2$ or lead fluoride $PbF_2$, wherein it comprises thermally decomposing lead fluosilicate or cobalt fluosilicate.

7 Claims, No Drawings

PROCESS FOR THE PREPARATION OF POROUS PRODUCTS BASED ON COBALT FLUORIDE OR LEAD FLUORIDE

BACKGROUND OF THE INVENTION

The present invention relates to a process for the preparation of porous products based on cobalt fluoride or lead fluoride.

More specifically, the invention relates to the preparation of products containing lead or cobalt fluorides in the form of a powder having a large specific surface, which are more particularly usable as sorbents for gas purification purposes.

In the case of cobalt fluoride-based products, they can in particular be used for the purification of uranium hexafluoride containing traces of plutonium hexafluoride and neptunium hexafluoride.

Thus, cobalt fluoride is able at between 93° and 230° C. to reduce neptunium hexafluoride and plutonium hexafluoride into solid tetrafluorides, which are retained by the cobalt fluoride-based porous product. A process of this type is described in French Pat. Nos. 2,034,805 and 2,111,730. For this particular use, the cobalt fluoride treatment capacity is in particular dependent on the specific surface of the cobalt fluoride powder used and this treatment capacity increases with the specific surface of the product. It is also important to have powders with a large specific surface.

BRIEF SUMMARY OF THE INVENTION

The present invention relates to a process for the preparation of porous products containing cobalt fluoride or lead fluoride having a large specific surface. This process consists of thermally decomposing lead fluosilicate or cobalt fluosilicate.

During this thermal decomposition, the lead fluosilicate ($PbSiF_6, 4H_2O$) or the cobalt fluosilicate ($CoSiF_6, 6H_2O$) decompose into a solid product (lead fluoride or cobalt fluoride) and into gases constituted by silicon tetrafluoride and water vapour. The removal of substance in the form of gaseous products ($SiF_4$ and $H_2O$) produces cavities distributed throughout the residual solid. When operating at a sufficiently low temperature, it is possible to retain a large proportion of the porosity produced by the removal of these gaseous substances. However, on carrying out the thermal decomposition at a high temperature, fritting then occurs of the fluoride powder obtained, which leads to a porosity loss.

A very important part is also played by the temperature used for carrying out the thermal decomposition of the lead or cobalt fluosilicate. In the case of cobalt fluosilicate, the thermal decomposition temperature is advantageously between 200° and 600° C. In the case of lead fluosilicate, the thermal decomposition temperature is advantageously between 200° and 270° C. Thus, in the latter case, it is necessary to work at a lower temperature, because as lead fluoride is subject to greater frittability than cobalt fluoride, the product obtained starts to frit at 270° C.

The process according to the invention can be used for directly obtaining powders or for preparing lead or cobalt fluoride-filled balls.

According to a first embodiment of the process according to the invention, a cobalt or lead fluoride powder is directly prepared. For the preparation of a cobalt fluoride powder, cobalt fluosilicate crystals are decomposed at a temperature between 200° and 600° C., which makes it possible to obtain a powder whose specific surface can vary between 120 and 10 $m^2/g$, as a function of the temperature used.

For the preparation of a lead fluoride powder, the lead fluosilicate crystals are decomposed at a temperature between 200° and 270° C., which makes it possible to obtain a lead fluoride powder whose specific surface can vary between 4 and 1 $m^2/g$, i,e. 33 to 8.24 $m^2/cm^3$ as a function of the temperature used.

In both cases, it is possible to control the specific surface of the powder obtained, by appropriately choosing the thermal decomposition temperature. In both cases, it is preferable to carry out thermal decomposition under a vacuum or an inert gas atmosphere, in order to prevent pyrohydrolysis of the fluorides obtained by the decomposition water.

According to a second embodiment of the process according to the invention, porous products are prepared, which are constituted by cobalt or lead fluoride-filled supporting balls.

In this case, the process consists of impregnating the porous material supporting balls with a solution of cobalt or lead fluosilicate. The thus impregnated balls then undergo a heat treatment at between 200° and 600° C. in the case of cobalt fluosilicate and 200° to 270° C. in the case of lead fluosilicate.

Thus, the lead or cobalt fluosilicate is directly decomposed on the supporting balls, which leads to the in situ formation of lead or cobalt fluoride having a large specific surface.

When preparing cobalt fluoride-filled balls, it is then possible to subject the thus obtained balls to a complementary heat treatment performed under vacuum or an inert gas atmosphere, in order to reduce the specific surface of the cobalt fluoride formed and thus adjust it to a lower value, which is sometimes preferable. Thus, cobalt fluoride with a large specific surface physically adsorbs a large amount of water, which it is difficult or even impossible to completely eliminate under the conditions of use (reactor). It is pointed out that this water elimination is necessary for preventing hydrolysis reactions of the neptunium and plutonium fluorides with the formation on the surface of the corresponding oxides, which may lead to the lead and cobalt fluorides losing their reducing properties.

The material forming the supporting balls is a mechanically strong, porous material having an appropriate porosity, e.g. an average pore radius between approximately 0.1 and 20 $\mu m$. In addition this material is chosen as a function of the use of the balls obtained. Thus, when the cobalt fluoride-filled balls are used for uranium hexafluoride treatment purposes, the material must remain chemically stable in the presence of uranium hexafluoride.

As an example of porous materials which can be used in this case, reference is made to corundum or $\alpha$ alumina balls with an average pore radius of 0.1 to approximately 20 $\mu m$.

The cobalt fluosilicate $CoSiF_6, 6H_2O$ used as the starting product in the process of the invention can be obtained by reacting fluosilicic acid $H_2SiF_6$ with cobalt or a cobalt salt, such as cobalt nitrate, cobalt acetate or cobalt carbonate.

When using a cobalt salt, the latter is dissolved in a suitable solvent, e.g. in acetone and to the cobalt salt solution is added a fluosilicic acid solution in slight excess compared with the stoichiometric quantity, in order to completely convert the cobalt salt into cobalt fluosilicate.

When working in a solvent such as acetone, the cobalt fluosilicate formed precipitates in the form of crystals, which can easily be separated from the solution by filtration, then washed and dried. When the cobalt fluosilicate formed is soluble in the solution, the latter is evaporated to obtain the cobalt fluosilicate crystals. The latter can be directly used for preparing the cobalt fluoride powder.

When the thus obtained cobalt fluosilicate is used for preparing cobalt fluoride-filled balls, the crystals are dissolved in a suitable solvent, e.g. water.

The lead fluosilicate used as the starting product in the process according to the invention can be obtained by reacting fluosilicic acid with lead oxide or a lead salt constituted by lead nitrate, acetate, carbonate or sulphate. As in the case of the cobalt fluosilicate, a slight fluosilicic acid excess is used in order to completely convert the lead salt or oxide into lead fluosilicate. When the lead fluosilicate obtained is to be used for preparing powders, the solution is concentrated by evaporation in order to obtain solid crystals of $PbSiF_6$, $4H_2O$, which are then dried.

If the lead fluosilicate is to be used for preparing lead fluoride-filled balls, the solution obtained by reacting lead oxide with an aqueous fluosilicic acid solution is directly used for the impregnation.

The lead or cobalt fluoride powders obtained by the process according to the invention can be used for the preparation of composite catalytic elements having a fine active coating based on lead or cobalt fluoride and a macroporous coating which is inert to all the fluorinating agents, serving as the substrate and ensuring the mechanical strength.

The preparation process for such composite elements consists of depositing on a macroporous support, a lead fluoride powder having a specific surface of 1 to 4 $m^2/g$ or a cobalt fluoride powder having a specific surface of 10 to 120 $m^2/g$, compressing the coated support and subjecting it to a heat treatment under vacuum or an inert atmosphere at a temperature below 270° C. in the case of lead fluoride or below 600° C. in the case of cobalt fluoride.

Advantageously, the macroporous support is constituted by a hollow cylindrical tube made from α alumina or fritted nickel. Preferably, the tube has a high permeability, a high porosity, a good mechanical strength and a sufficiently smooth internal or external surface state to permit a homogeneous, thin deposition of the lead or cobalt fluoride powder.

The powder can be deposited on the support in accordance with the conventional coating processes described in French Pat. Nos. 2,150,390 and 2,250,633.

According to French Pat. No. 2,150,390, coating is carried out by filtering an aqueous suspension containing particles of the deposited product through the porous walls of the support. According to the invention, when this filtration process is used for depositing the lead or cobalt fluoride powder on the macroporous support, non-aqueous cobalt or lead fluoride suspensions are used, due to the solubility of lead or cobalt fluoride, e.g. fluoride suspensions in an organic solvent such as an alcohol, an acetone, ethyl glycol, cyclohexane or methylcyclohexane.

According to the Sumitomo French Pat. No. 2,250,633 coating is carried out either by compressing a powder between the porous support and an auxiliary wall, or by electrophoresis, or by centrifuging a suspension. According to the invention, it is also possible to use these different processes for depositing lead or cobalt fluoride powder on the macroporous support.

Following this macroporous support coating stage, the coated support is compressed, preferably by isostatic compression using e.g. a flexible membrane or insert for preventing sticking, cf French Pat. Nos. 2,150,390 or 2,250,633.

Following this coated support compression stage, heat treatment is carried out, preferably in an inert atmosphere, at a temperature which is preferably below 500° C. when the deposited powder is cobalt fluoride, or at a temperature preferably below 250° C. when the deposited powder is lead fluoride.

DESCRIPTION OF THE PREFERRED EMBODIMENTS

Other features and advantages of the invention can be gathered from the following description of non-limitative embodiments.

EXAMPLE 1

Preparation of Cobalt Fluoride Powder 2900 g (10 moles) of cobalt nitrate $Co(NO_3)_2$, $6H_2O$ are dissolved in 10 liters of acetone, accompanied by stirring for 30 minutes. 4 liters of a fluosilicic acid solution containing 1440 g (10 moles) of $H_2SiF_6$ are then added within 45 minutes to the thus obtained solution. The mixture is stirred for a further 15 minutes, followed by the separation by filtration of the cobalt fluosilicate crystals, which precipitate in the solution and the thus obtained crystals are suction filtered. The crystals are then mixed with 5 liters of acetone. This is followed by filtering, suction filtering and drying in the open air at ambient temperature and in thin layer form. In this way, 2740 g (8.88 moles) of cobalt fluosilicate $CoSiF_6$, $6H_2O$ are obtained, which can be identified by X-ray diffraction.

The 2740 g of cobalt fluosilicate obtained in this way are then decomposed in an oven at a temperature of 220° C. and a reduced pressure of 25 mm of mercury. The fluosilicate is placed on a Monel plate, so as to give a layer of approximate thickness 25 mm. The temperature is raised to 225° C. for 90 minutes and is left at 220° C. for 2 hours. The $CoF_2$ powder obtained in this way is then rapidly placed in a tight bottle. The weight of the cobalt fluoride powder obtained in 880 g and its BET specific surface is 102 $m^2/g$.

EXAMPLE 2

Preparation of Cobalt Fluoride-Impregnated Alumina Balls 725 g (2.5 moles) of $Co(NO_3)_2$, $6H_2O$ are dissolved, accompanied by stirring over a period of 30 minutes in 2.5 liters of acetone. 1 liter of fluosilicic acid containing 360 g $H_gSiF_6$ (2.5 moles) is then added over a period of 30 minutes. Stirring then takes place for a further 15 minutes, followed by filtering and suction filtering. The product obtained is then washed with 1.5 liters of acetone, followed by drying in the open air at 25° C. In this way, 685 g of cobalt fluosilicate $CoSiF_6$, $6H_2O$ are obtained, which are stirred with 600 $cm^3$ of distilled water to obtain a saturated solution at ambient temperature. 700 g of alumina balls calcined at 1700° C. are immersed in this solution. A vacuum is formed and impregnation takes place for 2 hours. The balls are then drained, dried under a vacuum (25 mm of mercury) in the oven at 100° C. and the temperature is then raised for 1 hour to 220° C. and maintained for 2 hours to decompose $CoSiF_6$ into cobalt fluoride $CoF_2$. The weight of the $CoF_2$-impregnated balls obtained in this way is 700 g, which corresponds to a 10% weight increase. The BET specific surface of the balls is 10 m$^2$/g.

EXAMPLE 3

Preparation of Lead Fluoride Powder 1300 cc of a fluosilicic acid solution containing 670 g/l of $H_2SiF_6$ (6 moles) are placed in a polythene cup. Stirring takes place and 1338 g (6 moles) of PbO are added in small fractions, followed by slight cooling so as not to exceed a temperature of 35° C. After the addition of lead oxide PbO, stirring takes place for 30 minutes, followed by filtration to remove the insoluble traces. The thus obtained clear solution then undergoes evaporation under a vacuum of 15 to 20 mm of mercury in a rotary evaporator, heated on the water bath to 30° to 35° C. up to the start of crystallization. Transfer then takes place in thin layer form onto a plate and drying takes place for 7 days in the open air at between 25° and 30° C. In this way, 2380 g of dry crystals of $PbSiF_6$, $4H_2O$ are obtained which are then decomposed in an oven under a vacuum of 1 mm of mercury at 230° C., for 2 hours in a Monel dish with a layer thickness of 20 mm. In this way, 1480 g of lead fluoride $PbF_2$ are obtained with a BET specific surface of 3.2 m$^2$/g.

EXAMPLE 4

Preparation of Lead Fluoride-Impregnated Alumina Balls

Alumina balls with a diameter of 3 to 8 mm are prepared in the following way. 60% of alumina $CTB_3$ and 40% of alumina $LS_{15}$ in superground form are mixed. To this mixture are added 7% of sawdust and the balls are produced by means of a coating pan. They are then allowed to age and are then calcined at 1700° C.

A lead fluosilicate solution is prepared by adding in fractions 669 g (3 moles) of lead oxide PbO to a fluosilicic acid solution containing 670 g/l of $H_2SiF_6$ (3 moles) and accompanied by stirring. Cooling takes place in order not to exceed a temperature of 85° C. 700 g of alumina balls calcined at 1700° C. are then immersed in this solution, a vacuum is formed and impregnation takes place for 2 hours. The balls are then drained and after spreading them out, they are dried in the open air at 25° C. for 72 hours. The weight of the lead fluosilicate-impregnated balls is 968 g.

The lead fluosilicate balls are then decomposed in a vacuum furnace (2 mm of mercury), whilst raising the temperature for 3 hours to 250° C. and keeping them at this temperature for 2 hours. In this way, 865 g of $PbF_2$-impregnated balls are obtained with a weight increase thereof of 165 g, i.e. 23.6%.

EXAMPLE 5

Preparation of a Composite Element Constituted by a Nickel Support Coating with a Microporous Cobalt Fluoride Coating A cobalt fluoride powder suspension is prepared by mixing by means of an ultrasonic stirrer-grinder for 6 to 10 minutes, 1 liter of cyclohexane with 1.76 g of cobalt fluoride powder having a specific surface of 27 m$^2$/g obtained by the thermal decomposition of cobalt fluosilicate crystals at a final retreatment temperature of 550° C. The cobalt fluoride powder contained in the suspension is then deposited on a tubular nickel support having an internal diameter of 15 mm, a height of 1 m and an average pore diameter of 2 to 3 μm by filtering said suspension through the macroporous nickel support, which leads to the deposition of an internal $CoF_2$ powder coating with 8 mg of $CoF_2$/cm$^2$ of internal surface of the support. After depositing the coating, the coated support is dried in the oven for 20 minutes at 100° C. It is then allowed to cool and the coated support is isostatically compressed under a pressure of 5 MPa. It is then isostatically recompressed under a pressure of 10 to 20 MPa. The support then undergoes heat treatment under nitrogen at a temperature of 300° C.

Under these conditions and with a 27 m$^2$/g cobalt fluoride powder, for a deposit of 8 mg of $CoF_2$/cm$^2$ of support, an element is obtained having an average pore radius of 150 Å and a permeability in air of 1500.10$^7$ moles of air/cm$^2$/min.cm of mercury.

EXAMPLE 6

Use of Cobalt Fluoride-Filled Alumina Balls for the Purification of Uranium Hexafluoride In this example, use is made of a cylindrical reactor having a diameter of 20 mm and a length of 150 mm, filled with alumina balls containing 10% by weight of cobalt fluoride, with a specific surface of the balls of 2.5 m$^2$/g, which corresponds to a specific surface of approximately 24 m$^2$/g for cobalt fluoride. Pure alumina balls with a specific surface of approximately 0.1 m$^2$/g are placed at either end of the column of balls, in order to obtain in operation a homogeneous temperature throughout the cobalt fluoride-filled alumina ball column.

The cobalt fluoride-filled balls firstly undergo a degassing treatment at 150° C., for 2 hours and under vacuum, followed by a treatment at 150° C. with nitrogen scavenging for two additional hours.

Following this degassing operation, uranium hexafluoride containing 80 to 110 ppm of neptunium hexafluoride, under a pressure of 950 hPa, a flow rate of 0.163 g of uranium per second, corresponding to a surface speed of 8.04 cm/s is circulated in the reactor kept at a temperature of 150° C. for a period of 110 minutes. The neptunium content of the gas leaving the reactor is periodicially determined by α counting and at the end of the operation the neptunium quantity fixed to the cobalt fluoride-filled alumina balls is determined in order to establish the treatment capacity.

The results obtained are given in the attached table, which indicates the extreme values of the neptunium decontamination factor F, which is equal to the ratio:

$$F = \frac{N_pF_6/UF_6 \text{ before purification}}{N_pF_6/UF_6 \text{ after purification}}$$

The table also indicates the treatment capacity value corresponding to the mass of uranium hexafluoride containing 1 ppm of neptunium hexafluoride likely to be treated by 1 g of cobalt fluoride in order to obtain uranium hexafluoride containing no neptunium at the reactor outlet.

EXAMPLES 7 TO 10

Use of a CoF$_2$-Coated Composite Element for the Purification of Uranium Hexafluoride Each of these examples uses a composite element identical to that obtained in example 5, which comprises a fritted nickel tube internally covered with a cobalt fluoride coating having a specific surface of 27 m$^2$.g$^{-1}$. One of the ends of this element is sealed to permit the introduction of uranium hexafluoride containing traces of neptunium hexafluoride at the other end of said element, whilst the gaseous mixture can be forced to pass through the wall of said composite element.

Prior to use, the composite element undergoes a degassing treatment for 2 hours, at 150° C. and under nitrogen scavenging, followed by two additional hours at 150° C. and under vacuum. Uranium hexafluoride is then introduced at a pressure of 900 to 1000 hPa and the element is maintained at a temperature of 150° C. In examples 7 to 10, working takes place with different uranium flow rates and different neptunium hexafluoride contents. The neptunium hexafluoride contents and the uranium flow rates are given in the attached table. For examples 9 and 10, the uranium hexafluoride flow rate is varied during the test. Thus, in example 9, the starting uranium hexafluoride flow rate is 0.02 g of uranium/second, which is then increased to 0.135 g of uranium/second after 20 minutes of operation.

In example 10, a uranium hexafluoride flow rate of 0.034 g of uranium/second is used at the start of the test, which is increased to 0.135 g of uranium/second after 20 minutes operation. The results obtained are given in the attached table.

The table shows that the use of composite elements makes it possible to obtain high decontamination factors.

TABLE

| Examples | Support | CoF$_2$ content | Specific CoF$_2$ surface (m$^2$·g$^{-1}$) | nP content of UF$_6$ (ppm) | UF$_6$ flow rate g of U/s$^{-1}$ | Decontamination factor (F) | Capacity kg of UF$_6$/ g of CoF$_2$ |
| --- | --- | --- | --- | --- | --- | --- | --- |
| 6 | α alumina balls | 10% | 24 | 80–110 | 0.163 (surface speed of 8 cm·s$^{-1}$) | 81 to 22 (1 ppm) | 131 |
| 7 | Nickel tube | 1.76 g | 27 | 105–109 | 0.135 | 1170–500 (90 ppb) | >125 |
| 8 | Nickel tube | 1.76 g | 27 | 40–50 | 0.135 | 400–130 (10 ppb) | >125 |
| 9 | Nickel tube | 1.76 g | 27 | 45–55 | 0.02 0.135 | 600 (71 ppb) 600–195 (120 ppb) | >125 |
| 10 | Nickel tube | 1.76 g | 27 | 12–13 | 0.034 0.135 | 44 (220 ppb) (50 ppb) | >125 |

What is claimed is:

1. A process for producing cobalt fluoride useful in the preparation of porous products containing cobalt fluoride which comprises the steps of providing an amount of cobalt fluosilicate crystals and thermally decomposing the cobalt fluosilicate crystals at a temperature in the range of from about 200° to about 600° C. under vacuum or an inert atmosphere to provide cobalt fluoride powder having a specific surface of 10 to 120 m$^2$/g.

2. A process according to claim 1 including the further steps of providing macroporous support to be impregnated with the cobalt fluoride, dissolving the cobalt fluosilicate in a solvent to provide a solution of cobalt fluosilicate, impregnating the macroporous support with the cobalt fluosilicate solution and subjecting the thus impregnated support to a heat treatment to effect the decomposing step and thereby provide a cobalt-filled support.

3. A process according to claim 2, wherein the cobalt fluosilicate is prepared by reacting fluosilicic acid with a cobalt salt, said salt being dissolved in acetone.

4. A process according to claim 3, wherein the cobalt salt is cobalt nitrate or cobalt acetate.

5. A process according to claim 2, wherein the macroporous support is alumina balls having a mean pore radius of 0.1 to 20 μm.

6. A process according to claim 2, wherein the macroporous support is constituted by a hollow tube made from alumina or fritted nickel.

7. A process according to claim 2, wherein the cobalt fluoride powder is deposited on the support by filtering a suspension of said powder in an organic solvent through the said support.

* * * * *